Dec. 4, 1962

W. H. SCHUTMAAT ETAL 3,066,694

PRESSURE REGULATING VALVE

Original Filed March 30, 1959

INVENTORS.
WAYNE H. SCHUTMAAT.
WAYNE VANDER REYDEN.

BY

*Lockwood, Woodard, Smith & Weikart.*

ATTORNEYS.

United States Patent Office 3,066,694
Patented Dec. 4, 1962

3,066,694
PRESSURE REGULATING VALVE
Wayne H. Schutmaat, Elkhart, and Wayne Vander Reyden, Goshen, Ind., assignors to Penn Controls, Inc., Goshen, Ind., a corporation
Continuation of application Ser. No. 802,901, Mar. 30, 1959. This application Sept. 3, 1959, Ser. No. 838,822
2 Claims. (Cl. 137—505.36)

This invention relates generally to pressure regulating valves and in particular to a regulating valve of the straight-through type.

The performance of a gas pressure regulating valve, that is, how well it serves in maintaining a constant predetermined outlet pressure under conditions of variable flow rates and inlet pressures, can be indicated by a curve plotted by using rate of flow as the abscissa and the outlet pressure as the ordinate. A theoretically perfect regulator would give a constant pressure at all flow rates from zero to maximum, that is, a flat outlet pressure versus rate of flow curve.

There are several mechanical factors which prevent a conventional spring-loaded regulator from performing so as to produce a flat, horizontal outlet pressure versus rate of flow curve. One of these factors is the internal frictional characteristic or sensitivity of flexing of the diaphragm material itself. Another is the downstream or outlet pressure versus valve member position characteristic of the regulator, this characteristic being determined by the shape of the valve member with relation to the valve seat.

Another of the factors referred to is "spring effect." Thus, as flow through the valve increases, the valve must open wider to maintain the pressure loss constant across the restriction. In conventional regulators this means that the spring acting on the diaphragm and opposing the gas pressure increases in length as the valve opens wider. As the spring lengthens, it exerts a smaller amount of force on the diaphragm. Since the outlet pressure at the valve is a direct function of the force exerted by the regulator spring and since the force exerted by the spring decreases with increasing flow rates, the outlet pressure also drops with increasing flow rates. The regulator performance curve thus drops from its theoretical flat, horizontal configuration to an inclined configuration as a result of spring effect.

Another factor in the variation of the performance curve from its theoretical configuration is referred to as "body effect." This factor is a direct function of the turbulence produced in the gas stream as it passes through the valve. Conventionally, the spring effect is reduced by using long and flexible regulator springs, together with large diaphragm cases. This remedy has obvious limitations in that it produces regulator valve structures which are too bulky and cumbersome for many applications. Body effect is conventionally reduced by various valve body configurations which reduce turbulence in the gas flow through the valve.

It is the primary object of the present invention to provide a pressure regulator valve structure which minimizes both spring effect and body effect in the regulator performance and which utilizes a diaphragm to valve member linkage which compensates for the non-linear characteristics of the variation in motion with outlet pressure of the diaphragm and of the variation in outlet pressure with motion of the valve member.

A further object of the present invention is to provide a pressure regulator valve structure in which the gas or other regulated fluid passes straight through the valve, thus minimizing turbulence therein.

The full nature of the invention will be understood from the accompanying drawings and the following description and claims:

This application is a continuation of application Serial No. 802,901, filed March 30, 1959, now abandoned.

Figure 1:
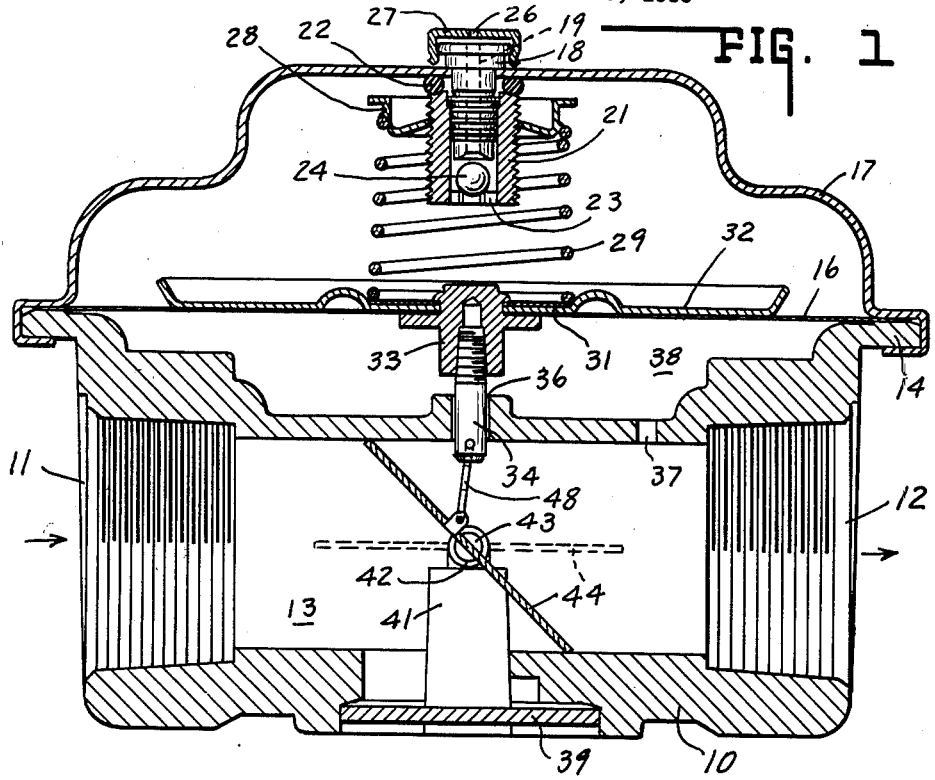
FIG. 1 is a side sectional view of a regulating valve embodying the present invention.

Referring initially to FIG. 1, reference numeral 10 identifies a generally cylindrical valve body having an inlet opening 11 and an outlet opening 12 at opposite ends. A passage 13, generally circular in cross section, connects the inlet opening and the outlet opening. The portions of the valve body adjacent the inlet and outlet openings are threaded to accommodate inlet and outlet conduits respectively, supplying gas under pressure through the valve.

The upper side of the valve body is formed to provide a circular flange 14 upon which is accommodated a flexible, gas impervious diaphragm 16. The peripheral marginal area of the diaphragm is clamped to the body flange by the stepped cover 17 which overlies the diaphragm.

The cover is apertured to accommodate a stud 18 having a central axial bore 19 therein. The stud is pressed into the enlarged bore of a threaded sleeve 21 and an O-ring 22 seals the upper end of the sleeve to the under face of the cover. The lower end of the threaded sleeve 21 accommodates a notched annular member 23, the member 23 and the lower end of the stud 18 defining a chamber in which a ball closure 24 is free to move. As the diaphragm 16 moves upwardly, expelling air from the chamber above the diaphragm, the ball will seat on the lower end of the stud 18, however, relatively large notches in the end of the stud permit air to pass through the bore 19 and out through the aperture 26 in the stud cap 27. When the diaphragm moves downwardly, requiring movement of air into the chamber above the diaphragm, the ball closure 24 is drawn against the annular member 23 and the rate of air flow into the chamber is limited by the relatively small notch in the annular member 23. This valve structure per se forms no part of the present invention.

Threaded on the sleeve 21 is a spring retaining plate 28 upon which is bottomed one end of a compression spring 29. The lower end of the compression spring rests upon a pad 31 supported by a backing plate 32. The plate 32 is secured to the diaphragm 16 by means of a flanged stud 33 which extends through the diaphragm and the plate.

The stud 33 has a threaded central bore which accommodates the stem 34, the stem extending freely through an aperture 36 in the valve body. An aperture 37 in the valve body provides communication between the passage 13 and the pressure chamber 38 formed at the under face of the diaphragm 16.

Figure 2:
FIG. 2 is a top plan view of the valve closure plate.
Figure 3:
FIG. 3 is a top plan view of a connecting link carried by the closure plate.

The lower portion of the valve body has an aperture therein which is closed by the disc 39. On opposite sides of the disc 39 the valve body is produced with indented portions 41 (only one of which is visible in FIG. 1). At their upper ends these indented portions are reduced in width to accommodate cylindrical bushings 42. The cylindrical bushings receive pins 43, formed of nylon or similar material, which are secured to opposite sides of an elliptical closure member or plate 44. As will be evident from FIG. 2, the inner ends of the pins 43 are accommodated within the notches 43a in the plate 44 by means of grooves around their lateral periphery. The plate 44 is thus provided with a pivotal mounting within the passage 13 with its pivotal axis being coincident with the minor axis of the elliptical plate. Slightly to one side of the pivotal axis of the plate, an ear 46 is struck therefrom, and, as may be seen in FIG. 2, the resulting aperture within the plate may be closed by any suitable means, such as a film 47 of a suitably sealing compound. A pivotal link or connector 48, formed as shown in FIG. 3, pivotally joins the ear 46 and the lower end of the stem 34.

It will be evident from the foregoing that, as shown in FIG. 1, the stem 34 is at the limit of its upward motion and the plate 44 is at approximately 45° with the axis of the passage 13 and closes off the flow of gas through the passage. As the stem 34 is moved downwardly, a force moment is applied to the plate, causing it to move toward its broken line position of FIG. 1, wherein it offers a minimum restriction to the flow of gas through the passage 13.

In operation, as gas under pressure is supplied to the inlet opening 11 and assuming that, for example, a gas burning appliance is connected to the outlet opening 12, since the pressure at the outlet opening and consequently in the pressure chamber 38 is relatively low, the force exerted by spring 29 will cause the plate 44 to move toward its wide open position, thereby allowing gas to flow through the valve body. When the inlet pressure, that is, the pressure at inlet 11 decreases, the upward force on the diaphragm 16 decreases, permitting the spring to move the diaphragm downwardly. The plate 44 is thereupon caused to move further toward a wide open position, thereby reducing the pressure drop between the inlet and outlet of the valve and consequently maintaining the downstream pressure relatively constant. When the inlet pressure increases above the regulator setting, the diaphragm and plate actions are reversed, that is, the plate is moved toward its solid line position of FIG. 1 to increase the pressure drop across the restriction provided by the plate 44 to again maintain the outlet pressure relatively constant.

Figure 4:
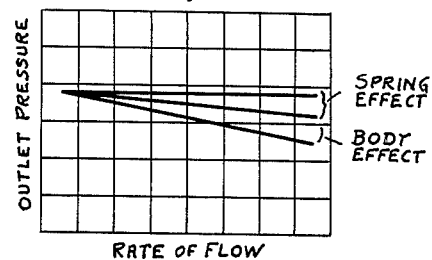
FIG. 4 is a graphic representation of regulator efficiency loss resulting from spring effect and body effect.

As will be evident from FIG. 4, in a conventional spring loaded regulator, as flow through the valve increases, the valve opens further to maintain a constant pressure drop across the restriction provided by the valve. Since the force exerted by the regulating spring decreases as its length increases, the outlet pressure decreases with increased rate of flow. This increment of error introduced into the regulator is indicated in FIG. 4 by the ordinal increment identified as "spring effect." As previously mentioned, turbulence in the valve body produces a further undesirable effect denoted in FIG. 4 as "body effect."

It will be noted that the present construction permits the plate 44 to move between closed and open position with relatively small motion of the diaphragm 16. The plate 44 is thus moved through its full range of motion with only a relatively small elongation of the regulator spring 29. Spring effect in the regulator performance is therefore substantially eliminated. The straight-through arrangement of the valve body permits gas to flow through the valve with a minimum of turbulence, the valve performance therefore being affected only by a minimum body effect. Since only a relatively small motion of the diaphragm is required to move the plate 44 through its range of motion, only a relatively small amount of air need be drawn into or expelled from the chamber above the diaphragm bounded by the cover 17. Air intake control devices, such as that formed by the sleeve 21 and the ball 24 may, therefore, be unnecessary on some installations. In the structure of the present invention, it will be apparent that the differential area, that is, the unobstructed area, increases sharply upon the initial downward movement of stem 34 from its solid line position of FIG. 1. The magnitude of this differential area is, of course, a direct function of the angular motion of the elliptical plate 44. Since the outlet pressure is determined by the position of elliptical plate 44 and this position is determined by the position of the valve member, which, in turn is determined by the outlet pressure, the structure provides a closed loop control system. The system is affected by the slight non-linearity of the motion response of the diaphragm to pressure variations at its underface and by the non-linearity of the downstream or outlet pressure variation with the motion of the elliptical plate or closure member 44. The pivotal linkage between the member 44 and the stem 34 is designed to compensate for these non-linearities. As herein described, the stem 34 is positioned so that an extension of its longitudinal axis would intersect the rotational axis of the member 44, and the lower pivotal axis of the link 48 is displaced only slightly sidewardly from the rotational axis of member 44. This arrangement provides satisfactory compensation of the system under certain conditions. For other conditions, for example, where a different size diaphragm or a diaphragm of differing sensitivity of flexing is used, proper system compensation will require the altering of the relative positions of the stem axis, the valve member rotational axis and the direction of extension of link 48. Such alterations of the geometry of the linkage between the valve stem and the closure member to achieve a compensating motion relationship between the valve member and the stem are considered to be within the scope of the present invention.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A gas pressure regulator valve structure including:
   a valve body having aligned inlet and outlet openings therein and a passage circular in cross section joining said openings and coaxial therewith;
   A closure for said passage comprising a generally elliptical plate pivotally mounted at its minor axis within said passage;
   means forming a pressure chamber on one side of said valve body;
   a flexible expanding diaphragm forming a movable wall for said pressure chamber;
   means for maintaining the pressure in said chamber equal to the static pressure downstream of said plate;
   resilient means opposing expansion of the flexible diaphragm;
   an actuating stem carried by said diaphragm and extending freely into said body;
   and a pivotal link joining said stem and a point on said plate to form a lever arm between said point and the minor axis of said plate, said link and said lever arm having lengths which substantially compensate for the non-linearity of the motion response of the diaphragm to pressure variations in the chamber and for the non-linearity of the downstream pressure response to the motion of the elliptical plate.

2. In combination with the gas pressure regulator valve structure specified in claim 1, a manual adjustment means connected to said resilient means to vary the force exerted by said resilient means to oppose expansion of said diaphragm.

References Cited in the file of this patent

UNITED STATES PATENTS

| | | |
|---|---|---|
| 2,668,396 | Kern | Feb. 9, 1954 |
| 2,757,683 | Biggle | Aug. 7, 1956 |

FOREIGN PATENTS

| | | |
|---|---|---|
| 11,225 | Great Britain | 1900 |
| 760,111 | Germany | Sept. 22, 1952 |